United States Patent [19]

Morgan

[11] 4,339,511
[45] Jul. 13, 1982

[54] PREPARATION OF POWDERS SUITABLE FOR CONVERSION TO USEFUL β-ALUMINAS

[75] Inventor: Peter E. D. Morgan, Thousand Oaks, Calif.

[73] Assignee: The United States of America as represented by the United States Department of Energy, Washington, D.C.

[21] Appl. No.: 254,710

[22] Filed: Apr. 16, 1981

Related U.S. Application Data

[63] Continuation of Ser. No. 99,237, Nov. 30, 1979, abandoned.

[51] Int. Cl.$^3$ ............................................. C04B 35/44
[52] U.S. Cl. .................................... 429/189; 264/61; 429/191; 429/193; 501/135
[58] Field of Search ..................... 501/135; 264/61; 429/191, 192, 193, 189

[56] References Cited

U.S. PATENT DOCUMENTS

| | | | |
|---|---|---|---|
| 4,013,477 | 3/1977 | Jatkar | 429/193 |
| 4,052,538 | 10/1977 | Eddy | 429/193 |
| 4,082,826 | 4/1978 | Iijima | 264/65 |
| 4,083,919 | 4/1978 | Pearlmon | 264/332 |
| 4,113,928 | 9/1978 | Virkar | 429/193 |
| 4,117,056 | 9/1978 | Jones | 264/57 |
| 4,151,235 | 4/1979 | May | 264/13 |
| 4,193,954 | 3/1980 | Speronello | 264/13 |
| 4,203,962 | 5/1980 | Lippman | 423/625 |

Primary Examiner—John A. Parrish
Attorney, Agent, or Firm—Leonard Belkin; Dean E. Carlson; James E. Denny

[57] ABSTRACT

A process for forming a precursor powder which, when suitably pressed and sintered forms highly pure, densified β- or β"-alumina, comprising the steps of:
(1) forming a suspension (or slurry) of Bayer-derived Al(OH)$_3$ in a water-miscible solvent;
(2) adding an aqueous solution of a Mg compound, a Li compound, a Na compound or mixtures thereof to the Bayer-derived Al(OH)$_3$ suspension while agitating the mixture formed thereby, to produce a gel;
(3) drying the gel at a temperature above the normal boiling point of water to produce a powder material;
(4) lightly ball milling and sieving said powder material; and
(5) heating the ball-milled and sieved powder material at a temperature of between 350° to 900° C. to form the β- or β"-alumina precursor powder. The precursor powder, thus formed, may be subsequently isopressed at a high pressure and sintered at an elevated temperature to produce β- or β"-alumina.

76 Claims, No Drawings

PREPARATION OF POWDERS SUITABLE FOR CONVERSION TO USEFUL β-ALUMINAS

BACKGROUND OF THE INVENTION

This invention was made in the course of or under a contract with the U.S. Department of Energy.

This is a continuation of application Ser. No. 099,237, filed Nov. 30, 1979, now abandoned.

FIELD OF THE INVENTION

This invention relates to a process for the production of β- or β''-alumina from a readily available, inexpensive starting material, specifically Bayer-derived aluminum hydrate, $Al(OH)_3$.

DESCRIPTION OF THE PRIOR ART

β-alumina is a material well-known in the prior art, being commercially available and exhibiting very good ionic conductivity properties. In view of these properties, β-alumina is fabricated into half cell separators for use in sodium-sulfur batteries.

The β- and β''-aluminas, which are the subject of this invention, may be broadly described by the chemical formula $Na_2O \cdot X Al_2O_3$. β-alumina is a hexagonal structure in which x is equal to 9 to 11. "Ideal" beta alumina may be considered to consist of spinel layers $(Al_{11}O_{16})^+$ interleaved with mirror plane layers of $(NaO)^-$. β''-alumina, in which x is equal to 5 to 7, has a rhombohedral spinel type structure and is found to be a better ionic conductor than β-alumina.

U.S. Pat. No. 4,082,826 discloses a conventional starting point for the preparation of β-alumina by mixing ordinary calcined alumina, $Al_2O_3$, with other ions. A method of preparing β-alumina by mixing a solution of aluminum alcoholate and an aqueous solution of an alkali metal to form a gel is described in U.S. Pat. No. 4,083,919. Subsequent drying, grinding and hot pressing the alumina composition, as described in this last reference, is performed by conventional means. The large RANN-ERDA program as described in S.A. Weiner, "Research on Electrodes and Electrolyte for the Ford Sodium-Sulfur Battery", RANN, Annual Report, January (1975), Semi-annual Report, July (1975), Semi-annual Report, January (1976), Annual Report, July (1976) and N.S.F. -C805 (AER-73-07199) Semi-Annual Report, January (1977), has produced much useful data for the economic production of Li-stabilized β''-alumina for the U.S. Na/S battery program.

An object of this invention is to provide a process for producing β- and β''-aluminas which are both efficacious and irreducibly simple and economic. The method employs Bayer-derived $Al(OH)_3$ as a pure starting material, which is both inexpensive and available in large quantity on a commercial scale.

Although the methods of preparing aluminas from alcoholates by the methods outlined in U.S. Pat. No. 4,083,919 and by myself in *Materials Research Bulletin,* Vol. 11, pp. 344–342, 1976, are both effective, they are significantly more expensive than the process of the present invention.

The more conventional approaches to preparing β-aluminas starting with ordinary alumina, of which U.S. Pat. No. 4,082,826 is representative, generally require not only a sintering step but also a terminal heat-treating stage at an elevated temperature. However, Bayer aluminum hydrate is much more reactive than standard $Al_2O_3$ and, decomposes and incorporates Na, Li, Mg, etc. ions into an amorphous or Na/Al mullite structure at a much lower temperature, i.e. on the order of 350°–600° C.). This increased reactivity, therefore, results in energy conservation.

Material processing, such as handling, drying, etc., is substantially improved by the unexpected formation of a pseudo-gel when aqueous solutions of Li, Na, are added to the isopropyl alcohol slurry of $Al(OH)_3$.

The Bayer process, as described in *The Condensed Chemical Dictionary,* 9th edition, revised by Gessner G. Hawley, Van Nostrand Reinhold Co., 1977, page 94, produces alumina from bauxite ore. The latter is mixed with hot concentrated NaOH, whereupon silica and alumina are dissolved. The silica is precipitated and separated from the remaining solution of alumina which is subsequently diluted and cooled to yield crystallized aluminum hydroxide. The final step of the process forms alumina, $Al_2O_3$, from the hydroxide by calcining. It is, however, the hydroxide, $Al(OH)_3$, which this invention employs as a starting material.

The washing of the crystalline $Al(OH)_3$ to remove sodium ions yields a pure product which is generally desirable in most industrial processes. However, such purification is probably unnecessary for the process of this invention, and in fact, it may be economically desirable to abbreviate the washing process yielding a starting product already containing higher amounts of the sodium constituent desired in the precursor powder. Such a Bayer-derived $Al(OH)_3$, since it would require less purification than the commonly used commercial material, would consequently be expected to be a less costly starting material.

I have previously shown in *Materials Research Bulletin,* Vol 11, pages 233–242 (1976), that such a material would normally produce a syntactically intergrown β+β''-alumina; however, the addition of lithium, magnesium ions, etc. can produce the singular β''-form in high quality upon heating to approximately 900° to 1200° C. The preparation of this latter form, a preferred embodiment of the present invention, results in a product, as stated above, having a much higher ionic conductivity than the more common and easily obtainable β-alumina form or mixed β+β'' alumina forms. The production of the crystallized β''-form does not have to be done separately from the sintering step. That is to say, the precursor powder may merely be lightly fired to 600° to 900° C. and remain as the "amorphous", η or sodium aluminum mullite forms. This powder can be green pressed by the usual ceramic techniques, that is, by uniaxial, isostatic, or even hot pressing and then sintered so that the crystalline β''-form develops during the sintering and densification operations. There are, in fact, advantages to this approach as detailed below.

It is increasingly apparent that ideal ceramic materials used as ion conductors must possess high density, fine grain size, exact stoichiometry and high purity. The most important step in obtaining such materials is producing the starting powder. If the precursor powder has the appropriate characteristics for sintering, synthesis and growth of the crystalline phase, the processing steps which depend primarily on the nature of the starting powder, may be simplified. Additionally, the temperatures of the firing may be lowered and the number of handling steps reduced. The starting powder must be studied on a system by system basis, but when the powder is prepared correctly, the formation of the ceramic can be greatly simplified, with many of the former problems simply disappearing. A more detailed explanation of this and related phenomena may be found in P. E. D. Morgan, "Chemical Processing of Ceramics" in "Processing of Crystalline Ceramics", editors Palmour, Davis and Hare, Plenum Press, (1978). P. E. D. Morgan and R. Staut, U.S. Pat. No. 3,974,108, and P.E.D. Morgan, *Bulletin of the American Ceramic Society*, 56, 432, (1977) describes the attention to details of powder synthesis and handling which allowed the ceramic, $La_{0.84}Sr_{0.16}CrO_3$, to be densified in air instead of reducing atmospheres while current theories suggested otherwise.

The terms "precursor" and "powder precursor", as used here, mean a species, distinct in crystal structure, which may be converted during the processing, i.e. sintering, densification, etc., to the desired crystal phase or phases.

It should be pointed out that once crystals are formed having certain crystalline matrices it frequently becomes difficult or impossible to convert such forms in the solid state to other, more desirable forms.

To show that once the formation of a mixture of separate crystals of $\beta+\beta''$ alumina or a $\beta+\beta''$ syntactic mixture, which is a layer by layer intergrowth, occurs, it is resistant to crystallization without a liquid phase present, samples were prepared that had been fired in different ways to generate varying quantities of $\beta$ or $\beta''$-alumina. The samples were then "cross sintered", i.e. samples sintered in air were resintered in water vapor and vice versa. Thus, a 1:5, Na: Al, sample sintered in water vapor initially contained more $\beta''$-alumina; one sintered in air contained more $\beta$-alumina. However, resintering was not found to significantly change the ratio of phases, thus confirming the supposition that the early stages of crystal development or precursor powders is critical to the ultimate conversion to single phase crystals.

Thus, the interconversion of $\beta$- to $\beta''$-alumina or $\beta''$- to $\beta$- alumina is extremely difficult as is the conversion of syntactic mixtures of $\beta+\beta''$ to pure phases of either $\beta$- or $\beta''$-alumina.

It may be noted that a "$\beta$-alumina", which is available commercially as Alcoa "XB-2 superground" is made from Bayer-derived aluminum hydrate or alumina. That product is a syntactic $\beta+\beta''$ mixture, not suitable for battery application. It must be stressed that the Li and/or Mg must be added *with* the sodium to the aluminum hydroxide and the decomposition of Al(OH)$_3$ to precursor done in their presence to form the precursor and/or mullite type *containing* the sodium and/or Li and/or magnesium. After $\beta$ forms have already been formed they cannot readily be interconverted. The appropriate $\beta$ form must be formed coincidentally with the sintering operation in a reactive mode.

Another conventional approach to obtaining the more desirable ionic conductor is to nucleate, or "seed" a $\beta$ containing mixture (that is, a mixture of or syntactic intergrowth of $\beta+\beta''$-alumina) with a $\beta''$-alumina seed crystal, but the $\beta''$-phase must grow out of the unstable matrix which includes the $\beta$ form, and this has been related to the formation of long lathes of the $\beta''$ form, reducing, undesirably, ceramic strength. While there are methods of minimizing this problem, it is better to completely avoid such problems by starting with a powder that produces more directly a nearly isotropic $\beta''$-phase, as does the powder of the present invention.

SUMMARY OF THE INVENTION

In accordance with this invention, I have developed a method for preparing powder precursors which may be subsequently converted to $\beta$- or $\beta''$-alumina comprising the steps:

(1) forming a suspension (or slurry) of Bayer-derived Al(OH)$_3$ in a water-miscible solvent;

(2) adding an aqueous solution of a Mg compound, a Li compound, a Na compound or mixtures thereof to the Bayer-derived Al(OH)$_3$ suspension while agitating the mixture formed thereby to produce a gel;

(3) drying said gel at a temperature above the normal boiling point of water to produce a powder material;

(4) lightly ball milling and sieving said powder material; and (5) heating said ball-milled and sieved powder material at a temperature of between 350° to 900° C. to form the $\beta$- or $\beta''$-alumina precursor powder. The precursor powder, thus formed, may subsequently be isopressed at a high pressure and sintered at an elevated temperature to produce $\beta$- or $\beta''$-alumina.

The precursor powders may be converted to $\beta$- or $\beta''$-alumina by isopressing the precursor powders at a pressure from approximately 25,000 psi to 100,000 psi and sintering at a temperature from approximately 1400° to 1800° C. Other techniques for compaction and heating as would be known to one skilled in the art may be used, alternatively.

It is an object of this invention to produce $\beta$-and $\beta''$-aluminas and their precursor powders with a readily available, inexpensive starting material, specifically Bayer Al(OH)$_3$.

Additionally, it is an object of this invention to provide an energy efficient method for the formation of $\beta$- and $\beta''$-aluminas.

It is a further object to provide a method for producing $\beta$- and $\beta''$-aluminas or their precursors which have uniform microstructure and high density.

It is also an object of the instant invention to provide a simple method of preparing $\beta$- and $\beta''$-aluminas.

It is additionally an object of this invention to produce precursor powders which may be easily converted to $\beta$- or $\beta''$-aluminas having high sodium ion conductivity.

DETAILED DESCRIPTION OF THE INVENTION $\beta$- and $\beta''$-aluminas are materials which are anticipated to have widespread use as solid ion-conductor electrolytes in electric storage batteries in combination with numerous electrode materials over a broad range of operating conditions. For example, $\beta$-alumina is employed to fabricate half-cell separators to use in high energy batteries which comprise a molten sodium anode and a molten sulfur cathode at the operating temperature of the devices. Since $\beta''$alumina offers higher ion-conductivity than does $\beta$-alumina, it is expected that it will be the preferred material in such devices.

One of the unique aspects of the present invention is the choice of starting material. Any commercial process which utilizes a material that is both readily available and inexpensive may be considered to be a highly desirable method. The present process employs such a material, namely Al(OH)$_3$ obtained from the Bayer process.

While the stepwise process of the present invention is described in detail below, a conceptual understanding of the transformations taking place in the overall process is necessary for full comprehension of the stepwise procedure. The initial step of blending an aqueous solution containing magnesium and/or lithium and/or sodium compounds with a suspension of Al(OH)$_3$ to form a gel, allows these ions to be homogeneously dispersed through the mixture.

The drying step, carried out above the normal boiling point of water, removes superficial water to provide a dry powder of Al(OH)$_3$ having an average particle size of approximately five microns. As aluminum hydroxide is a clay-like material similar to bayerite, talc, kaolinite, etc., it has a high adsorptive capacity. It is able, therefore, to adsorb large quantities of ions with a minimal separation of such ions. Thus positioned, the ions are required to move only relatively short distances in order to achieve a homogeneous precursor on decomposition.

The light ball milling and sieving manipulations reduce agglomeration and allow for better green compaction and densification upon sintering.

It is the heating step that follows sieving which actually forms the precursor powder. In addition to eliminating water of crystallization. The initial heating stage, termed the "decomposition stage", occurring at a temperature up to about 500° C., converts the superficially dried Al(OH)$_3$ to the precursor powder desirable for ultimate conversion to $\beta$- or $\beta''$-alumina. It must be stressed that the novelty of the process is to mix in the required ions, Na, Li, Mg, etc. *before* decomposition (distinguishing the process from any utilising Al$_2$O$_3$) so that the reactivity brought about by decomposition of the hydroxide, i.e., crystalline rearrangements, occurs in the presence of the added ions which are thereby thoroughly incorporated in the precursor structure. The precise mechanism and temperature at which such a converson occurs is less well understood than is the morphology of the resulting precursor. Such precursor powders may consist of $\eta$-alumina or sodium aluminum mullite. The powder produced by low temperature calcination of Al(OH)$_3$ with lithium and sodium compounds below 700° C. is not well characterized because the crystalline structure is poor, with very broadened x-ray diffraction peaks. There is no doubt, however, that the structure is usually of the $\eta$ or $\beta$ cubic defect spinel types and definitely incorporates lithium and sodium within the lattice. (P. E. D. Morgan, *Materials Research Bulletin*, 11, 233, 1976). Such matrices have an equiaxed orientation and a higher density than Al(CH)$_3$. Because such structures are cubic, the powders are isotropic in morphology. This is true also of the mullite type, which is tetragonal, and may form in some instances. The parameters influencing the formation of such doped aluminas is not exactly known although it seems to be quite dependent on the starting aluminum hydroxide.

An ideal ionic conductive ceramic should, besides offering low resistivity, provide adequate strength and resistance to cracking. The present invention achieves these objects by improving such variables as density, uniformity of particle size and purity of a single morphological phase. The decomposition stage accomplishes all of these desirable features to a large extent; that is, equiaxed orientation is developed, particle or crystal size is decreased to approximately 0.01 to 0.1 microns and lacking density is increased. However, it is the second phase of heating, the "prefiring" or "preconditioning" stage, that improves the later densification which ultimately results in many of the properties desirable for such a ceramic material. In this prefiring stage, which occurs at a temperature of from approximately 350° to 600° C., the particles grow to more uniform size which allows for good green compaction.

It should be stressed that in order to obtain the high density requisite for a ceramic product used as an ionic conductor, having both low resistivity and great strength, it is necessary to maximize densification prior to sintering. Insufficient densification will be achieved if the green bodies do not already have sufficiently high density.

It should also be emphasized that although the decomposition and preconditioning steps have been described herein as two separate processes, they are usually carried out as a single step.

It may also be noted that since the combined heating process provides the morphology of the precursor which allows conversion during the later sintering stage to a single phase $\beta$- or $\beta''$-alumina, it does not require the time and energy consuming manipulations such as crystal seeding and/or annealing after sintering. These latter manipulations are employed by conventional methods in an attempt to increase the concentration or purity of one of the $\beta$ phases once they have formed. While such techniques may achieve this purpose to some degree, they rarely obtain the degree of purity resulting from the formation of the correct precursor powders of the present invention and suffer from drawbacks such as discontinuous grain growth.

It is the last step of the present method, sintering, which converts the precursor pressed powders to the desired $\beta$ phases.

Procedurally, the first step of the process involves the high speed blending of the appropriate aqueous solutions with slurries of Bayer-derived aluminum hydroxide. Any water miscible solvent may be employed as a suspending agent for the aluminum hydroxide, suitable examples being low molecular weight ketones and alcohols, isopropyl alcohol being most preferred.

Inclusion of magnesium or lithium ions in the mixture favors formation of the $\beta''$-alumina. The addition of lithium as lithium carbonate, acetate, nitrate or other easily decomposable salt is quite satisfactory, LiOH is favored since it tends to form more well defined crystals of the $\beta''$-form than do magnesium ions which can also introduce defects into the spinel blocks, i.e. six or eight layer spinel blocks instead of the desired four layer type. Lithium seems to avoid this problem. Sodium ions are preferably supplied by aqueous solutions of NaHCO$_3$, although other sources such as sodium carbonate or its hydrates, sodium acetate, sodium nitrate or other easily decomposable salts may be employed. If the $\beta$-form is the desired end product, an aqueous solution containing only a sodium compound need be added to the Bayer-derived aluminum hydroxide slurry.

The proportions of suitable compounds added to the aluminum hydroxide slurry are dictated entirely by the chemistry required to produce the particular atom ratios. Effective proportions of NaHCO$_3$: LiOH: Al(OH)$_3$ for producing the $\beta''$- form of alumina lie between 1:1/8:5 to 1:1/2:5 with the preferred proportion being 1:1/4:5 Na/La/Al while Na:Al atom proportions for producing $\beta$-alumina would be 1:8 to 1:11 with the preferred ratio being 1:8.

It is generally held that at lower sodium contents, i.e., under conditions at which the Na:Al ratio is approximately 1:11 to 1:8, $\beta$-aluminas form, while at a content of 1:5, or alternatively by driving off sodium from NaAlO$_2$, $\beta''$-alumina forms, but this is not strictly timely.

This invention is concerned with a method of forming both the $\beta$- and $\beta''$-monophases of alumina. However, because of the higher ion conductivity of the $\beta''$-form, formation of this phase is preferred. The $\beta''$-phase without stabilization by Li or Mg, begins to decompose at ~1500° C. to the $\beta$-form. Some early observers assumed that this was due to volatilization of sodium so that the 1:5 Na:Al $\beta''$-form conversion to 1:8 $\beta$-form occurs. This is now known not to be so. These ideas are summarized by Y. Le Cars, J. Thery, R. Collongues, "Domaine D'Existence Et Stabilite Des Alumines $\beta$ et $\beta''$ Dans Le Systeme Al$_2$O$_3$-Na$_2$O. Etude Par Rayons X Et Microscopie Electronique", Rev. Int. Hautes Temper. et Refract., 9, 163-160 (1972). It has been assumed that Li and Mg stabilize $\beta''$ but problems occur, especially with Mg, in that $\beta''$ and $\beta^{iv}$ may be seen. Some observers have expressed the opinion that even "stabilized" $\beta''$-forms may decompose at the most elevated temperatures, approximately 1700°-1800° C. One of the purposes of this invention was separately to produce each of the purest monophase $\beta$- and $\beta''$-aluminas, after discovering that nearly all samples prepared heretofore were, in fact, syntactic mixtures of the two.

In cases where the atom ratio of Na:Al is 1:5 (without Li and Mg) rather poor syntactic $\beta + \beta''$-form always appears.. A steam or ammonia atmosphere during sintering tends to encourage the formation of the $\beta''$-form; hydrogen has no noticeable effect. Sintering in air leads to a $\beta + \beta''$-form very similar in X-ray diffraction patterns to 1:11 samples sintered in air. 1:4 and 1:3 samples tend to produce more $\beta$ again, especially the 1:3 cases where NaAlO$_2$ is apparent. Both Mg and Li additions to 1:5 compositions stimulate $\beta''$ formation.

It was also observed that although the presence of magnesium stimulates the formation of the $\beta''$-form, the overall crystallinity up to 1500° C. is still rather poor. The X-ray diffraction patterns show the broadening of certain peaks susceptible to layer intergrowths, but, qualitatively, the broadening looks different from that seen in the 1:5, without Mg systems. Even in the 1:1/4:5 sample with deficient Mg (presumably) because the "ideal" formula of $\beta''$ is thought to be Na$_2$O.MgO.5Al$_2$O$_3$ (i.e., 1:½:5) this effect was seen. It is not, then, recommended that Mg additions be used to produce $\beta''$-aluminas at least up to 1500° C.

In situations employing a ratio of Na:Li:Al, 1:1/4:5, only half the monovalent Li$^+$ is necessary compared to Mg$^{2+}$. Traces of LiAl$_5$O$_8$ have been seen in only one case, in ammonia sintering where loss of sodium was sometimes noted. Otherwise this composition gives excellent $\beta''$-alumina especially with steam sintering. Although a few samples of Na:Li:Al, 1:1/8:5 give excellent $\beta''$-forms, there is some variability and it does appear that 1:1/4:5 is nearer to the ideal proportions.

Significant differences are achieved when comparing samples made from unfired precursor powders which are dried at 120° C., with samples from precursors pre-fired at 600° C. Unfired powder samples nearly always crack and bloat, and are friable, but crystallinity is often superior, due most probably to the generation of water vapor in the samples which "mineralize" the early stages. The cracking and bloating make the method impractical for useful generation of samples.

While any suitable form of Bayer-derived aluminum hydroxide is suitable in carrying out the method of the present invention, the formation of the best powder precursors is a function of the starting material, as indicated above. Alcoa Hydral 710 and C331 Grades were used in the work resulting in the present invention.

Blending of mixtures of the Bayer-derived slurries with aqueous solutions is accomplished on a large scale by using a large blender fitted with an aluminum "propeller blade".

Addition of the aqueous solutions to the aluminum hydroxide slurry results in almost immediate formation of a gel or gel-like mixture. The gels thus formed are dried in air at a temperature above the boiling point of water in any conventional drying oven; a temperature of 120° C. was found to be quite effective.

Light ball milling and sieving through a 200-mesh screen is performed to remove agglomerates.

To produce the $\eta$ or sodium aluminum mullite structures the dried powder can be heated in a conventional air furnace slowly from a temperature of 350° to 600° C. or up to 900° C. at a rate of 2°-3° C./minute. This heating procedure allows both the decomposition and preconditioning stages to occur in a single step, and is, therefore, most preferred.

Alternatively, one may carry out the heating stage in separate steps, that is, the decomposition step may be carried out at some temperature between 350°-600° C. The second phase of heating, the preconditioning or prefiring stage, may be carried out in a second step at a temperature between approximately 500°-900° C. It is understood that the methods used here on the lab scale of drying and firing could be adapted to a modern approach of spray drying and/or roasting whereby the slurry of Al(OH)$_3$+Na/Li/Mg could be spray dried and/or roasted within the temperature regions outlined to allow a continuous production of $\beta$ or $\beta''$ precursor powders. The decomposed powder may also be fired to a temperature between 900°-1200° C. to preform the $\beta$-or $\beta''$-crystal species. The exact method adopted depends upon which crystalline form one wishes to obtain at the end of the sintering step. However, for the highest density $\beta''$-alumina it is better to form the ceramic green body from the precursor powder rather than from the preformed $\beta$ or $\beta''$ species.

The dried prefired material is then isopressed in the range of 25,000 psi to 100,000 psi may be used but isopressing at approximately 50,000 psi has been found quite effective.

The final stage of the process requires standard sintering of the $\beta$- or $\beta''$-aluminas or their precursor bodies at elevated temperatures. Sodium loss is conveniently minimized by surrounding the bodies with powder of the same composition which has not passed through the 200-mesh screen.

The suitable temperature range for final sintering of the material is between 1400° C. and 1800° C., with a preferred range of between 1500° to 1650° C. Raising the temperature of the furnace to the sintering temperature takes place over a period of approximately six hours, but variations in heating times are possible. The rate of heating is approximately 2°-10° C./minute and preferably 5° C./minute. The furnace is then held at the final temperature for two hours, although in some cases it may be required to maintain the sintering temperature for approximately one day.

Atmospheres which may be used within the tubes include air, 100% water vapor (supplied from a steam generator), hydrogen or ammonia.

Sintering in water vapor generally tends to improve crystallinity; however, sodium seems to be more volatile. Air seems to be the simplest method which provides adequate results.

Sintering for long periods at 1500° C. produces approximately 90% of maximum density 1:1/4:5 Na:Li:Al $\beta'''$-ceramics, but at 1590° C. sintering for two hours produces a density of 95%+ of maximum density. This composition also gave the lowest resistivity at 300° C., 13.7 ohms, centimeters at 95% density and is, therefore, the most preferred form. By slight manipulation of some of these parameters, it is expected that lower resistance values could be obtained.

Suitable examples of the method in which the above described process may be carried out are given below.

EXAMPLE I

To produce the 1:1/4:5, Na:Li:AL,$\beta'''$-precursor composition, 390 g (5 moles) of Al(OH)$_3$ (C331, hydral 705 or other aluminum trihydroxide) was mixed with about 1 liter of isopropanol in a high speed blender so that a fairly liquid slurry was produced. While still blending rapidly, 84 g (1 mole) of NaHCO$_3$, sodium bicarbonate, dissolved in 100 ml of distilled water and, concurrently, 10.5 g (¼ mole) of LiOH.H$_2$O, dissolved in about 50 ml distilled water, was added. As the aqueous solutions were added the slurry thickened to the consistency of thick paint, stirring was stopped and the resultant material was placed in an evaporation basin and dried slowly at a temperature of ~ 120° C. The material was then lightly milled, heated to 900° C., lightly milled again and sieved through a 200 mesh screen.

EXAMPLE II

The same method employed in Example I was used to produce a 1:8, Na:Al $\beta$-presursor powder; however, the addition of LiOH.H$_2$O solution was omitted and the proportions of NaHCO$_3$: Al(OH)$_3$ were different. In this case, 52.5 g (0.625 moles) of NaHCO$_3$, dissolved in 100 ml of distilled water, was added to the same amount of Al(OH)$_3$ in 1 liter of isopropanol.

While the invention has been described in detail with reference to specific preferred embodiments thereof, it will be apparent to one skilled in the art that various changes and modifications can be made in the described procedures without departing from the spirit and scope of the invention.

What is claimed is:

1. A precursor powder which, when suitably pressed and sintered, forms a highly pure monophase, densified $\beta$-alumina, which is formed by the steps comprising:
   (1) forming a suspension or slurry of Bayer-derived Al(OH)$_3$ in a water-miscible suspending agent;
   (2) adding an aqueous solution of a Na compound and either a Li compound or a Mg compound to the Bayer-derived Al(OH)$_3$ suspension while agitating the mixture formed thereby, to produce a gel-like material;
   (3) drying said gel-like material at a temperature above the normal boiling point of H$_2$O to produce a powder material;
   (4) lightly ball milling and sieving said powder material;
   (5) heating said ball-milled and sieved powder material at a temperature of between 350°–900° C. to form the $\beta'''$-alumina precursor powder.

2. The precursor powder of claim 1, wherein the aqueous solution has dissolved therein a Li compound.

3. The precursor powder of claim 1, wherein the aqueous solution has dissolved therein a Na compound.

4. The precursor powder of claim 1, wherein the aqueous solution has dissolved therein LiOH.

5. The precursor powder of claim 1, wherein the aqueous solution has dissolved therein NaHCO$_3$.

6. The precursor powder of claim 1, wherein the gel-like material is dried at a temperature of 120° C.

7. The precursor powder of claim 1, wherein the powder material is ball milled and sieved through a 200-mesh screen.

8. The precursor powder of claim 1, wherein said ball-milled and sieved powder material is heated within the temperature range of 500°–700° C.

9. The precursor powder of claim 1, wherein the aqueous solution has dissolved therein NaHCO$_3$ and LiOH.

10. The precursor powder of claim 1, wherein said ball-milled and sieved powder material is heated gradually within the range of 350°–900° C.

11. The precursor powder of claim 1 wherein said ball-milled and sieved powder material is heated gradually within the range of 500°–700° C. and held at the upper temperature limit.

12. The precursor powder of claim 1 wherein said ball-milled and sieved powder material is heated gradually within the range of 350°–900° C. and held at the upper temperature limit.

13. The precursor powder of claim 1, wherein the water-miscible suspending agent is a low molecular weight ketone or alcohol.

14. The precursor powder of claim 1, wherein the water-miscible suspending agent is isopropyl alcohol.

15. A method of forming a $\beta'''$-alumina precursor powder from Bayer-derived Al(OH)$_3$ which produces a highly pure monophase alumina comprising the steps of:
   (1) forming a suspension on slurry of Bayer-derived Al(OH)$_3$ in a water-miscible suspending agent;
   (2) adding an aqueous solution of a Na compound and either a Li compound or a Mg compound to the Bayer-derived Al(OH)$_3$ suspension while agitating the mixture formed thereby, to produce a gel-like material;
   (3) drying said gel-like material at a temperature above the normal boiling point of H$_2$O to produce a powder material;
   (4) lightly ball milling and sieving said powder material;
   (5) heating said ball-milled and sieved powder material at a temperature of between 350°–900° C. to form the $\beta'''$-alumina precursor powder.

16. The method of claim 15, wherein the aqueous solution has dissolved therein a Li compound.

17. The method of claim 15, wherein the aqueous solution has dissolved therein a Na compound.

18. The method of claim 15, wherein the aqueous solution has dissolved therein LiOH.

19. The method of claim 15, wherein the aqueous solution has dissolved therein NaHCO$_3$.

20. The method of claim 15, wherein the gel-like material is dried at a temperature of 120° C.

21. The method of claim 15, wherein the powder material is ball milled and sieved through a 200-mesh screen.

22. The method of claim 15, wherein said ball-milled and sieved powder material is heated within the temperature range of 500°–700° C.

23. The method of claim 15, wherein the aqueous solution has dissolved therein NaHCO$_3$ and LiOH.

24. The method of claim 15, wherein said ball-milled and sieved powder material is heated gradually within the range of 350°–900° C.

25. The method of claim 15 wherein said ball-milled and sieved powder material is heated gradually within the range of 500°–700° C. and held at the upper temperature limit.

26. The method of claim 15 wherein said ball-milled and sieved powder material is heated gradually within the range of 350°–900° C. and held at the upper temperature limit.

27. The method of claim 15, wherein the water-miscible suspending agent is a low molecular weight ketone or alcohol.

28. The method of claim 15, wherein the water-miscible suspending agent is isopropyl alcohol.

29. A method of forming a highly pure monophase β″-alumina from Bayer-derived Al(OH)$_3$ comprising the steps of:
   (1) forming a suspension or slurry of Bayer-derived Al(OH)$_3$ in a water-miscible suspending agent;
   (2) adding an aqueous solution of a Na compound, and either a Li compound or a Mg compound to the Bayer-derived Al(OH)$_3$ suspension while agitating the mixture formed thereby, to produce a gel-like material;
   (3) drying said gel-like material at a temperature above the normal boiling point of H$_2$O to produce a powder material;
   (4) lightly ball milling and sieving said powder material;
   (5) heating said ball-milled and sieved powder material at a temperature of between 350°–900° C. to form the β″-alumina precursor powder;.
   (6) isopressing said β″-alumina precursor powder at from 25,000 to 100,000 p.s.i.;
   (7) sintering at a temperature of from 1400°–1800° C.

30. The method of claim 29, wherein isopressing of the β″-alumina precursor is carried out at 50,000 p.s.i.

31. The method of claim 29, wherein sintering of the β″-alumina precursor is carried out at a temperature of 1500° to 1650° C.

32. The method of claim 29, wherein the aqueous solution has dissolved therein a Li compound.

33. The method of claim 29, wherein the aqueous solution has dissolved therein a Na compound.

34. The method of claim 29, wherein the aqueous solution has dissolved therein LiOH.

35. The method of claim 29, wherein the aqueous solution has dissolved therein NaHCO$_3$.

36. The method of claim 29, wherein the gel is dried at a temperature of 120° C.

37. The method of claim 29, wherein the powder material is ball milled and sieved through a 200-mesh screen.

38. The method of claim 29, wherein said ball-milled and sieved powder material is heated within the temperature range of 500°–700° C.

39. The method of claim 29, wherein the aqueous solution has dissolved therein NaHCO$_3$ and LiOH.

40. The method of claim 29, wherein said ball-milled and sieved powder material is heated gradually within the range of 350°–900° C.

41. The method of claim 29 wherein said ball-milled and sieved powder material is heated gradually within the range of 500°–700° C. and held at the upper temperature limit.

42. The method of claim 29 wherein said ball-milled and sieved powder material is heated gradually within the range of 350°–900° C. and held at the upper temperature limit.

43. The method of claim 29, wherein said water-miscible suspending agent is a low molecular weight alcohol or ketone.

44. The method of claim 29, wherein said water-miscible suspending agent is isopropyl alcohol.

45. A precursor powder which, when suitably pressed and sintered, forms a highly pure monophase, densified β-alumina, which is formed by the steps comprising:
   (1) forming a suspension or slurry of Bayer-derived Al(OH)$_3$ in a water-miscible suspending agent;
   (2) adding an aqueous solution of a Na compound to the Bayer-derived Al(OH)$_3$ suspension while agitating the mixture formed thereby, to produce a gel-like material;
   (3) drying said gel-like material at a temperature above the normal boiling point of H$_2$O to produce a powder material;
   (4) lightly ball milling and sieving said powder material;
   (5) heating said ball-milled and sieved powder material at a temperature of between 350°–900° C. to form the β-alumina precursor powder.

46. The precursor powder of claim 45, wherein the aqueous solution has dissolved therein NaHCO$_3$.

47. The precursor powder of claim 45, wherein the gel-like material is dried at a temperature of 120° C.

48. The precursor powder of claim 45, wherein the powder material is ball milled and sieved through a 200-mesh screen.

49. The precursor powder of claim 45, wherein said ball-milled and sieved powder material is heated within the temperature range of 500°–700° C.

50. The precursor powder of claim 45, wherein said ball-milled and sieved powder material is heated gradually within the range of 350°–900° C.

51. The precursor powder of claim 45 wherein said ball-milled and sieved powder material is heated gradually within the range of 500°–700° C. and held at the upper temperature limit.

52. The precursor powder of claim 45 wherein said ball-milled and sieved powder material is heated gradually within the range of 350°–900° C. and held at the upper temperature limit.

53. The precursor powder of claim 45, wherein the water-miscible suspending agent is a low molecular weight ketone or alcohol.

54. The precursor powder of claim 45, wherein the water-miscible suspending agent is isopropyl alcohol.

55. A method of forming a highly pure monophase a β-alumina precursor powder from Bayer-derived Al(OH)$_3$ which produces a highly pure monophase alumina comprising the steps of:
   (1) forming a suspension or slurry of Bayer-derived Al(OH)$_3$ in a water-miscible suspending agent;
   (2) adding an aqueous solution of a Na compound to the Bayer-derived Al(OH)$_3$ suspension while agitating the mixture formed thereby, to produce a gel-like material;

(3) drying said gel-like material at a temperature above the normal boiling point of H₂O to produce a powder material;
(4) lightly ball milling and sieving said powder material;
(5) heating said ball-milled and sieved powder material at a temperature of between 350°–900° C. to form the β-alumina precursor powder.

56. The method of claim 55, wherein the aqueous solution has dissolved therein $NaHCO_3$.

57. The method of claim 55, wherein the gel-like material is dried at a temperature of 120° C.

58. The method of claim 55, wherein the powder material is ball milled and sieved through a 200-mesh screen.

59. The method of claim 55, wherein said ball-milled and sieved powder material is heated within the temperature range of 500°–700° C.

60. The method of claim 55, wherein said ball-milled and sieved powder material is heated gradually within the range of 350°–900° C.

61. The method of claim 55 wherein said ball-milled and sieved powder material is heated gradually within the range of 500°–700° C. and held at the upper temperature limit.

62. The method of claim 55 wherein said ball-milled and sieved powder material is heated gradually within the range of 350°–900° C. and held at the upper temperature limit.

63. The method of claim 55, wherein the water-miscible suspending agent is a low molecular weight ketone or alcohol.

64. The method of claim 55, wherein the water-miscible suspending agent is isopropyl alcohol.

65. A method of forming β-alumina from Bayer-derived $Al(OH)_3$ comprising the steps of:
(1) forming a suspension or slurry of Bayer-derived $Al(OH)_3$ in a water-miscible suspending agent;
(2) adding an aqueous solution of a Na compound, to the Bayer-derived $Al(OH)_3$ suspension while agitating the mixture formed thereby, to produce a gel-like material;
(3) drying said gel-like material at a temperature above the normal boiling point of H₂O to produce a powder material;
(4) lightly ball milling and sieving said powder material;
(5) heating said ball-milled and sieved powder material at a temperature of between 350°–900° C. to form the β-alumina precursor powder;
(6) isopressing said β-alumina precursor powder at from 25,000 to 100,000 p.s.i.;
(7) sintering at a temperature of from 1400°–1800° C.

66. The method of claim 65, wherein isopressing of the β-alumina precursor is carried out at 50,000 p.s.i.

67. The method of claim 65, wherein sintering of the β-alumina precursor is carried out at a temperature of 1500° to 1650° C.

68. The method of claim 65, wherein the aqueous solution has dissolved therein $NaHCO_3$.

69. The method of claim 65, wherein the gel is dried at a temperature of 120° C.

70. The method of claim 65, wherein the powder material is ball milled and sieved through a 200-mesh screen.

71. The method of claim 65, wherein said ball-milled and sieved powder material is heated within the temperature range of 500°–700° C.

72. The method of claim 65, wherein said ball-milled and sieved powder material is heated gradually within the range of 350°–900° C.

73. The method of claim 65 wherein said ball-milled and sieved powder material is heated gradually within the range of 500°–700° C. and held at the upper temperature limit.

74. The method of claim 65 wherein said ball-milled and sieved powder material is heated gradually within the range of 350°–900° C. and held at the upper temperature limit.

75. The method of claim 65, wherein said water-miscible suspending agent is a low molecular weight alcohol or ketone.

76. The method of claim 65, wherein said water-miscible suspending agent is isopropyl alcohol.

* * * * *